United States Patent Office 3,751,529
Patented Aug. 7, 1973

3,751,529
PREPARATION OF ESTERS OF PHOSPHORUS ACIDS
Joseph W. Baker and Ingatius Schumacher, St. Louis, Mo., assignors to Monsanto Company, St. Louis, Mo.
No Drawing. Filed June 24, 1971, Ser. No. 156,477
Int. Cl. C07f 9/12, 9/18
U.S. Cl. 260—973    16 Claims

ABSTRACT OF THE DISCLOSURE

Esters of phosphorus acids are prepared by an improved process whereby thiol- or hydroxyl-containing organic materials and phosphorus halides are reacted at specified temperatures in the presence of carbamate catalysts thereby providing high yields of substantially pure esters and allowing preparation of selected mono-, di- and tri-esters of phosphorus acids having substantially no side reactant contamination. By means of this improved process, mono-, di- and tri-esters of phosphorus acids may be selectively prepared. They are useful as plasticizers and processing aids and as intermediates in the preparation of plasticizers, oil additives and functional fluids.

BACKGROUND OF THE INVENTION

This invention relates to a novel process for the preparation of organophosphorus acid esters. More particularly, this invention is concerned with a process comprising a carbamate catalyzed reaction of halides of phosphorus and thiol- or hydroxyl-containing organic materials.

Numerous methods have been long known for preparing organophosphorus esters. One of those methods involves the reaction of a phosphoryl halide and a monohydric organic compound without the use of a catalyst. Such a process is not commercially practical because of the need for lengthy reaction times and the resultant low yields. Another disadvantage of processes of that type is the need for the use of excessive amounts of the monohydric organic compound.

Another known method comprises the addition of certain amines to the aforedescribed reaction mixture to effect higher yields. The cost of the amines and the cost of recovering the amines for use in the process renders the method impractical for commercial operation.

In still other methods, the reaction is catalyzed, so as to produce greater yields, by adding a metal to the reaction mixture, such as copper powder, iron filings, calcium, aluminum or magnesium; or a halide such as aluminum chloride, magnesium chloride or boron trifluoride; or a sulfate such as copper sulfate; or an oxide such as magnesium oxide or copper oxide.

The employment of such catalysts has several attendant inherent disadvantages, among which are low conversion of the starting materials and lengthy reaction times required for completion of the reaction. As described in U.S. Patents 2,610,978 and 2,632,018, an insoluble complex forms during the reaction when aluminum chloride is used as a catalyst.

When alcohols are reacted with a phosphoryl halide, either without a catalyst or in the presence of any of the above-mentioned catalysts, other than magnesium chloride, undesirable by-products are formed. The by-products contribute difficult distillation problems, lower yields of the desired product and lower reaction efficiency. A method described in U.S. Patent 2,410,118 is illustrative of the typical distillation problems encountered. In that method, distillation is difficult due to the high concentration of salts of various phosphorus acids in the distillation still.

U.S. Patent 2,868,827 describes the use of titanium tetrachloride as a catalyst for producing organophosphate esters. Disadvantages encountered employing titanium tetrachloride reside in the excessive and lengthy times necessary to obtain desirable yields and the relatively large amounts of the metal halide catalysts required. Further, when the reaction is conducted in the presence of a titanium halide catalyst, recovery of the desired reaction product is a problem. At the completion of the reaction, it has been found necessary to wash the reaction mixture with a citrate or tartrate solution which forms a complex with the titanium catalyst. The complex is then removed by washing with water followed by drying the remaining product.

Another disadvantage encountered with the employment of many of the aforedescribed catalysts is the need for complicated material-handling procedures for the catalyst.

Additionally, preparation of organophosphorus esters by the aforedescribed catalyzed reactions restricts the manufacturer in that only one specific type of organophosphorus ester of high purity could be prepared by the reaction. Thus, one could not prepare compounds of high purity such as, for example, cresyl diphenyl phosphate, bromophenyl diphenyl phosphate, phenyl bis (chlorophenyl)phosphate, cresyl phenyl phosphorochloridate and the like. By the aforedescribed procedures, only relatively impure triorganophosphorus esters or esters containing the same aryl groups could be prepared, for example, triphenyl phosphate, tricresyl phosphate and the like. Thus, in the preparation of triorganophosphorus esters by the aforedescribed procedures, the specific triorganophosphorus esters prepared were contaminated by side reactants which could only be removed by lengthy and difficult washing and distillation procedures.

Accordingly, the objective of this invention is to provide a novel and improved catalytic process for the preparation of organophosphorus esters in which the disadvantages of the prior are are eliminated and selective esterification in high yields with substantially no by-product contamination is afforded.

SUMMARY OF THE INVENTION

The objective of this invention is accomplished by a novel catalyzed process, combining a critical combination of catalyst and reaction temperature, for the preparation of organophosphorus acid esters wherein high yields of product are formed with substantially no side reactions and contaminants and whereby step-wise building of the ester is allowed in such a manner that mixed esters are prepared in an easy and economical manner. As an example of the innovative process of this invention, a compound such as chlorophenyl cresyl phenyl phosphate may be conveniently and inexpensively prepared, such preparation being difficult and expensive with known methods now available to the art. Further, mixtures of mono-, di- or tri-chlorophenyl phosphorus esters, mono-, di- or tri-cresyl phosphorus esters and mono-, di- or tri-phenyl phosphorus esters may all be prepared in the same reaction vessel with substantially no contamination by side reactants and the products may be separated by distillation without undesirable disproportionation.

The novel process of this invention comprises reaction, at specific temperatures, of halides of phosphorus of the formula (I)

wherein X represents oxygen or sulfur; Y represents R or R′X wherein R represents alkyl, alkenyl, alkynyl, cycloalkyl, cycloalkenyl, cycloalkynyl, heterocyclic or aryl; R′ represents alkyl or aryl; $m$ represents 0 when $n$ is 3, $m$ represents 1 when $n$ is 2 and $m$ represents 2 when $n$ is 1; Z represents chloro or bromo; and $n$ represents 1, 2 or 3, with a compound having the formula (II) $\quad$ R"XH wherein R" represents aryl and X represents oxygen or sulfur, in the presence of a carbamate catalyst.

The reaction sequence involved in the process of this invention proceeds through the following stages, exemplified by the reaction of phenol with phosphorus oxychloride:

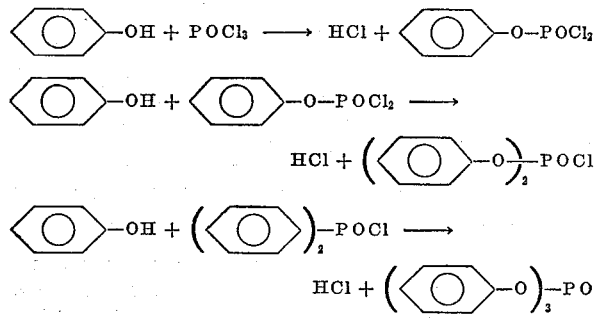

The phosphorus mono- and di-halidates produced are valuable intermediates in the preparation of plasticizers, oil additives and functional fluids and are prepared conveniently by the process of this invention and in high yield with substantially no contamination by side reactions.

The carbamate catalysts used in the process of this invention may, in general, be any carbamate which is characterized by the presence of a nitrogen atom capable of entering into a complex with the phosphorus moiety of Formula I. Essentially all carbamates capable of such complex are contemplated as catalysts in this process.

The catalyst concentration which is most effective in the process is a function of many variables, but is generally from about 0.001 to 2.0 mole percent based on the phosphorus halide. Preferably, from 0.01 to 0.1 mole percent is considered a practical level. Of course, greater or lesser amounts may be used effectively within the discretion and experience of those skilled in the art. Thus, the following list of carbamate compounds is intended merely to illustrate the broad scope of the carbamate compounds which are useful as catalysts herein since it would be virtually impossible to specifically list each carbamate intended.

Representative carbamates which may be used as catalysts in the process of this invention include the following compounds, which are merely illustrative and are not to be considered limitative since, as denfied above, any carbamate is suitable providing it can coordinate with the phosphorus atom of Formula I, without restriction on the number of carbon or nitrogen atoms in the carbamate molecule or the substituents which may be attached thereto. Thus, carbamates of the formulas

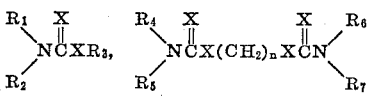

and

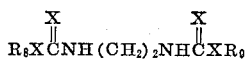

are illustrative of compounds wherein X represents oxygen or sulfur, $R_1$ and $R_2$ individually represent hydrogen, alkyl, alkenyl, alkynyl, cycloalkyl, cycloalkenyl, cycloalkynyl, aryl, heterocyclyl and combinations and variations thereof whether substituted or not, and $R_3$, $R_4$, $R_5$, $R_6$, $R_7$, $R_8$ and $R_9$ individually represent alkyl, alkenyl, alkynyl, cycloalkyl, cycloalkenyl, cycloalkynyl, aryl, heterocyclyl and combinations and variations thereof whether substituted or not. Further, $R_1$ and $R_2$, $R_4$ and $R_5$, and $R_6$ and $R_7$ may cyclize and combine to form a heterocyclyl group. The following list of illustrative compounds is therefore to be read in the light of the above teachings.

ALIPHATIC AND ALICYCLIC CARBAMATES

Methyl carbamate
Ethyl carbamate
Propyl carbamate
Isopropyl carbamate
Butyl carbamate
Amyl carbamate
Hexyl carbamate
Heptyl carbamate
Octyl thiocarbamate
Nonyl carbamate
Decyl carbamate
Undecyl carbamate
Dodecyl carbamate
Tridecyl carbamate
Pentadecyl thiocarbamate
Octadecyl thiocarbamate
Nonadecyl carbamate
Eicosyl carbamate
Triacontyl carbamate
Butyl N-methylcarbamate
Ethyl N-ethylcarbamate
Methyl N-amylthiocarbamate
Amyl N-decyldithiocarbamate
Methyl N-octadecylcarbamate
Didodecyl dicarbamate
Didodecyl dithiodicarbamate
Didodecyl tetrathiodicarbamate
Octyl N,N-dimethylcarbamate
Hexyl N,N-dioctylcarbamate
Cyclohexyl N,N-diundecylcarbamate
Methyl N,N-diheptylthiocarbamate
Methyl N-methylcarbamate
Methyl N-ethylcarbamate
Octyl N-undecylcarbamate
Nonadecyl N-octylcarbamate
Heptyl N-butylthiocarbamate
Butyl N,N-diethylcarbamate
Octadecyl N,N-didodecylcarbamate
Ethyl N,N-dibutylcarbamate
Tetracontyl N,N-dimethylcarbamate
Octadecyl N,N-dibutylthiocarbamate
Butyl N,N-dihexyldithiocarbamate
Cyclopropyl carbamate
Cyclobutyl carbamate
Cyclopentyl carbamate
Cyclopentyl thiocarbamate
Cyclohexyl dithiocarbamate
Ethyl N,N-dicyclohexyldicarbamate
Methyl N-cyclopropylcarbamate
Ethyl N-cyclohexylcarbamate
N,N-dicyclobutyldithiocarbamate
N,N-dicyclopropylcarbamate
Cyclohexyl N-cyclopropylcarbamate
Cyclobutyl N-cyclobutylcarbamate
Cyclohexyl N,N-dicyclopropylcarbamate
Cyclopropyl N,N-dicyclohexylcarbamate

AROMATIC CARBAMATES

Phenyl carbamate
Benzyl carbamate
Phthalyl carbamate
Naphthyl carbamate
Allylbenzyl thiocarbamate
Cresyl carbamate
Phenethyl carbamate
Dibiphenyl dicarbamate
N-phenylcarbamate
N-benzylcarbamate
Phenyl N-biphenylcarbamate
Benzyl N,N-dibenzylcarbamate
Benzyl N,N-diphenylcarbamate Phenyl N,N-diphenylthiocarbamate
Benzyl N,N-diphenyldithiocarbamate
Phenethyl N,N-dinaphthylcarbamate
Naphthyl N,N-phenyl, benzylcarbamate
Tolyl carbamate
Xylyl carbamate

MIXED CARBAMATES

Methyl N,N-di-t-butylcresyldithiocarbamate
Ethyl N-diethylbenzylcarbamate
Propyl N,N-di-n-propylbenzylcarbamate
Isopropyl N,N-dimethoxybenzylcarbamate
Butyl N-3-nitro-p-ethylbenzylcarbamate
Ethyl N,N-di-2-(methoxy-4-allylphenyl)carbamate
Methyl N-2,4-diaminophenylcarbamate
Hexyl N,N-di-(p-cymyl)carbamate
Octyl N,N-diallyl-p-cymylcarbamate
Biphenyl N,N-dinaphthylcarbamate
Phenanthryl N-phenylcarbamate
N-nitrophenylthiocarbamate
Methoxybenzyl carbamate
Ethyl N-phenylcarbamate
Ethyl N,N-diphenylcarbamate
Ethyl N,N-methylphenylcarbamate
Phenyl N,N-dimethylcarbamate
Ethyl N-phenylcarbamate
Cyclohexyl N-benzylthiocarbamate
Cyclobutyl N-ethyldithiocarbamate
Octadecyl N-benzylcarbamate
Benzyl N-dodecylcarbamate
Cyclobutyl N,N-phenyl ethylcarbamate
Butyl N,N-octadecyl cyclohexylcarbamate
Heptyl N-phenylthiocarbamate
Cyclohexy N,N-dinaphthylcarbamate
Biphenyl N,N-dicyclobutylcarbamate
Naphthyl N,N-didodecylcarbamate
Phenyl N,N-dihexylcarbamate

HETEROCYCLIC CARBAMATES

Thineyl carbamate
Dibenzofuryl carbamate
Benzothiophenyl thiocarbamate
Pyrrolidinyl carbamate
Dipyridyl dicarbamate
Thiophenyl dithiocarbamate
Pyrrolidonyl carbamate
N-benzothiophenylcarbamate
N-pyridyl carbamate
Benzofuryl carbamate
N,N-dithienyl carbamate
N,N-dipyridyl carbamate
N-imidazolyl pyridyl carbamate
Benzofuryl N-imidazolinylthiocarbamate
N-thienylcarbamate
Pyridyl N-ethylcarbamate
Cyclohexyl N-thiophenylcarbamate
Ethyl 1,4-butanecarbamate
Methyl 1,5-pentanecarbamate
Butyl ethylenecarbamate
Nonyl 1,6-hexanecarbamate It is intended that thiocarbamates and dithiocarbamates as well as olefinic and acetylenic compounds corresponding to those compounds described above are considered within the scope of catalysts intended for use in the present invention. Thus, alkenyl carbamates, alkenylaryl carbamates, alkynyl carbamates, cycloalkenyl carbamates and olefinically unsaturated heterocyclic carbamates are intended. By way of example, but not limitative, of the compounds described above are propenyl carbamate, octadecenyl carbamate, allylbenzyl carbamate, propynyl carbamate, undecynyl carbamate, cyclopentenyl carbamate, N-decynyl carbamate, N,N-dipentenyl carbamate, N,N-diethyl cyclopropenyl carbamate, N-cyclopropenyl carbamate and N-cyclohexenyl butyl carbamate. Obviously, hundreds of further compounds could be included but such a list would be impractical and to no real purpose. It is believed that the description, above, of the types of compounds intended is sufficient for those skilled in the art.

It is intended that the term "carbamate" applied to the catalysts heretofore described include the metal, ammonium, alkylammonium and amine salts thereof.

Representative metal salts include the lithium, sodium, potassium, calcium, strontium, barium, titanium zirconium, vanadium, chromium, molybdenum, tungsten, copper, silver, zinc, aluminum, tin, lead, antimony, iron, cobalt, nickel and mercury salts.

In general, any salt formed by reaction of a metal, ammonium, alkylammonium or amine compound with the described carbamates will function effectively as a catalyst in the process of this invention. Typical salts include sodium carbamate, calcium carbamate, ammonium carbamate, ammonium thiocarbamate, ammonium dithiocarbamate, silver dithiocarbamate, iron carbamate, mercury thiocarbamate, ethylammonium carbamate, ethylammonium dithiocarbamate, diethylammonium dithiocarbamate, ammonium diethylcarbamate, the salt of 1,2-ethylenebiscarbamate and analogous compounds.

The types of phosphorus halides utilized and prepared in accordance with this invention may be either starting materials or intermediates or end products of the process. For instance, a phosphoryl halide may be a starting material used to prepare a dihalidate phosphorus monoester such as a R' phosphorodihalidate. The R' phosphorodihalidate may be an intermediate in the preparation of, for example, a monohalidate phosphorous diester such as a di-R' phosphorohalidate. The di-R' phosphorohalidate may be used as an intermediate in the preparation of a phosphorus triester end product. At the same time, however, the R' phosphorodihalidate and di-R' phosphorohalidate may be considered mono- and di-ester end products of the process of this invention. The phosphorus halides utilized are well known to those skilled in the art. Many are commercially available and all are easily prepared in accordance with the process of this invention. The compounds are encompassed by the scope of Formula I and include, by way of illustration, compounds such as:

Phosphoryl halides:

Thiophosphoryl halides:

R' phosphorodihalidates:

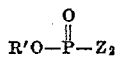

O-R' phosphorodihalidothioates:

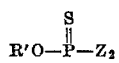

S-R' phosphorodihalidothioates:

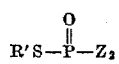

S-R' phosphorodihalidothioates:

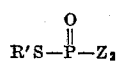

S-R phosphorodihalidodithioates:

$$R'S-\overset{S}{\underset{\|}{P}}-Z_2$$

Di-R' phosphorohalidates:

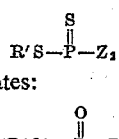

O,O-Di-R' phosphorohalidothioates:

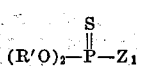

O,S-Di-R' phosphorohalidothioates:

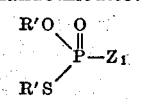

S,S-Di-R' phosphorohalidodithioates:

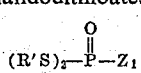

O,S-Di-R' phosphorohalidodithioates:

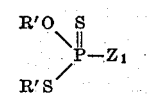

S,S-Di-R' phosphorohalidotrithioates:

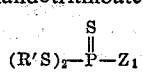

R-phosphonic dihalides:

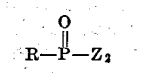

R-phosphonothioic dihalides:

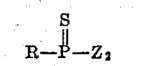

Di-R-phosphinic halides:

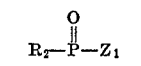

Di-R-phosphinothioic halides:

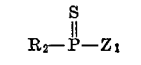

R'R-phosphonohalidates:

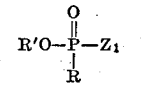

R'R-phosphonohalidothioates:

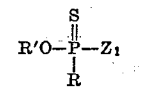

S-R' R-phosphonohalidothioates:

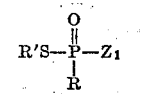

S-R' R-phosphonohalidodithioates:

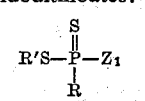

In the above formulas R, R' and Z are defined as in Formula I.

As described in Formula I, R represents alkyl, e.g., methyl, ethyl, propyl, butyl, amyl, hexyl, heptyl, octyl, decyl, undecyl, dodecyl, pentadecyl, hexadecyl, octadecyl, nonadecyl and eicosyl, whether straight or branched chain on configuration; cycloalkyl, e.g., cyclopropyl, cyclobutyl, cyclopentyl, ethylcyclopropyl, cyclohexyl, methylcyclopentyl, methylcyclohexyl, decahydronaphthyl, bicyclohexyl (cyclohexylcyclohexyl), tetradecahydrophenanthryl, tricyclohexylmethyl; alkenyl, e.g., ethenyl, propenyl, butenyl, isobutenyl, pentenyl, methylbutenyl, trimethylethenyl, hexenyl, heptenyl, octenyl, nonenyl, decenyl, dodecenyl, tridecenyl, hexadecenyl, octadecenyl, eicosenyl; cycloalkenyl, e.g., cyclopropenyl, cyclopentenyl, cyclohexenyl, cyclohexylcyclohexenyl; alkynyl, e.g., ethynyl, propynyl, butynyl, pentynyl, hexynyl, heptynyl, octynyl, nonynyl, decynyl, tridecynyl, octadecynyl, eicosynyl; cycloalkynyl, e.g., 1 - cycloden - 4 - yl; heterocyclic radicals containing oxygen or sulfur in the heterocyclic ring, e.g., thiophenyl, furanyl, tetrahydrofuranyl, pyranyl, sulfolanyl; aryl, e.g., phenyl, naphthyl, biphenyl, phenanthryl, anthracyl, terphenyl or quaterphenyl; and R' represents alkyl or aryl, as described above with reference to R.

R and R' may be unsubstituted, as described above, or substituted. It is to be understood that the carbamate catalysts of this invention will catalyze the preparation of organophosphate esters in accordance with this invention regardless of the type or extent of substitution of the radicals defined as included within R and R' above. Thus the radicals represented by R and R' may be substituted with any organic moiety except a carboxyl group or a hydroxyl group which interfere with the reaction.

The following radicals are illustrative of the substituents which may occur on the groups represented by R and R' of the phosphorus halides and $R_1$, $R_2$, $R_3$, $R_4$, $R_5$, $R_6$, $R_7$, $R_8$ and $R_9$ of the carbamate catalysts: alkyl, cycloalkyl, alkenyl, cycloalkenyl, alkynyl, cycloalkynyl, and aryl as described above. Also, halo, e.g., chloro, bromo, fluoro, iodo; alkoxy, e.g., methoxy, propoxy, butoxy, hexoxy, decoxy; cycloalkoxy, e.g., cyclohexoxy, cyclobutoxy; alkenoxy, e.g., propenoxy; cycloalkenoxy, e.g., cyclopentenoxy, aryloxy, e.g., phenoxy, naphthoxy; cyano; nitro, isonitro; aldehyde; ketone; alkoxycarbonyl, e.g., methoxycarbonyl; aryloxycarbonyl, e.g., phenoxycarbonyl; alkylcarbonyloxy, e.g., acetyl, alkoxycarbonyloxy, e.g., acetoxy; arylcarbonyloxy, e.g., benzoyl; alkylthio, e.g., ethylthio; arylthio, e.g., phenylthio, naphthylthio; trihaloalkyl, e.g., trifluoromethyl; alkylsulfinyl, e.g., butylsulfinyl; arylsulfinyl, e.g., phenylsulfinyl; alkylsulfonyl, e.g., propylsulfonyl; arylsulfonyl, e.g., phenylsulfonyl; thiocarbamyl; alkylthiocarbamyl, e.g., ethylthiocarbamyl; arylthiocarbanyl, e.g., phenylthiocarbanyl.

Specific phosphorus halides which are encompassed within the scope of this invention include phosphoryl chloride, phosphoryl bromide, phosphoryl dibromide chloride, thiophosphoryl chloride and bromide, phenyl phosphorodichloridate, p-chlorophenyl phosphorodibromidate, p-nitrophenyl phosphorodichloridate, p-nitrophenylphosphorodichloridothioate, cresyl phosphorodichloridate, o-methoxyphenyl phosphorodichloridate, nonylphenyl phosphorodichloridate, cumylphenyl phosphorodichloridate, o - biphenyl phosphorodichloridate, naphthyl phosphorodichloridate, isopropylphenyl, phosphorodichloridate, tert-butylphenyl phosphorodichloridate, isodecyl phosphorodichloridate, S-phenyl phosphorodichloridothioate, S-p-nitrophenyl phosphorodichloridothioate, S-phenyl phosphorodichloridodithioate, diphenyl phosphorochloridate, dicresyl phosphorochloridate, dibutyl phosphorodichloridate, dihexyl phosphorodichloridate, dioctyl phosphorodichloridate, didecyl phosphorodichloridate, O,O-diphenyl phosphorochloridothioate, O,O-dimethyl phosphorochloridothtioate, O,O-diethyl phosphorochloridothioate, S,S-diphenyl phosphorobromidodithioate, phenylphosphonic dichloride, p-chlorophenylphosphonic dibromide, methylphosphonic dichloride, chloromethylphosphonic dichloride, phenylphosphonothioic dichloride, cresylphosphonothioic dibromide, methylphosphonothioic dichloride, chloromethylphosphonothioic dichloride, diphenylphosphinic chloride, diphenylphosphinic bromide, dimethylphosphinic chloride, diethylphosphinic bromide, diphenylphosphinothioic chloride, dimethylphosphinothioic chloride, ethylmethylphosphinothioic bromide, phenyl phenylphosphonochloridate, p-nitrophenyl phenylphosphonochloridate, cresyl phenylphosphonochloridate, O-phenyl phenylphosphonochloridothioate, O-ethyl phenylphosphonochloridothioate, S-phenyl phenylphosphonobromidothioate, S-phenyl phenylphosphonochloridodithioate, The alcohols and thioalcohols embraced by the scope of Formula II include those compounds wherein R'' represents aryl groups as defined with respect to R and R' of the phosphorus halides. Thus, R'' represents phenyl, alkylphenyl, halophenyl, arylphenyl, cycloalkylphenyl, naphthyl, biphenyl, phenanthryl, anthracyl, terphenyl, quaterphenyl, whether substituted or nonsubstituted.

Specific alcohols of the formula R''XH which will illustrate the types of compounds utilized include phenol, o, m, p-cresol, o-ethylphenol, o, m, p-isopropylphenol, p-tert-butylphenol, p-tert-amylphenol, nonylphenol, 2,4-xylenol, 2,6-xylenol, 2,5-xylenol, 2,3-xylenol, o, m, p-chlorophenol, p-bromophenol, p-iodophenol, 2,4-dichlorophenol, 2,4,5 - trichlorophenol, pentachlorophenol, o-phenolphenol, p-cumylphenyl, o-cyclohexylphenol, α-naphthol, β-naphthol, o-methoxyphenol, p-ethoxyphenol, o-phenoxyphenol, p-nitrophenol, p-trifluoromethylphenol, 2-allylphenol, 2-benzylphenol, vanillin, 4-chloro-3,5-dimethylphenol, 4-chloro-1-naphthol, 2 - chloro - 4 - nitrophenol, 4-cyanophenol, 2,4-di-tert-butylphenol, 2,4-dimethoxyphenol, methylsalicylate, 2 - fluorophenol, p-hydroxyacetophenone, 4 - hydroxybenzaldehyde, thiophenol, p - chlorothiophenol, p - tert - butylthiophenol, thiocresol, thioxylenol, phenylthiophenol, thionaphthol, allylthiophenol.

The compounds of Formulas I and II, described above, are generally known in the art and their methods of preparation are available in standard texts and reference sources.

A preferred class of the compounds of Formula I are those compounds of the formula

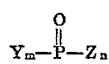

$$Y_m-\overset{O}{\overset{\|}{P}}-Z_n$$

wherein Y=R or R'O wherein R'=aryl or substituted aryl and R, Z, m and n are defined in Formula I. Representative of this preferred class of compounds are phosphoryl chloride, phosphoryl bromide, phenyl phosphorodichloridate, p-chlorophenyl phosphorodibromidate, p-nitrophenyl phosphorodichloridate, cresyl phosphorodichloridate, o-methoxyphenylphosphorodichloridate, nonylphenyl phosphorodichloridate, cumylphenyl phosphorodichloridate, o-biphenyl phosphorodichloridate, naphthyl phosphorodichloridate, isopropylphenyl phosphorodichloridate, tert-butylphenyl phosphorodichloridate, diphenyl phosphorochloridate, dicresyl phosphorochloridate, phenylphosphonic dichloride, p-chlorophenylphosphonic dichloride, methylphosphonic dibromide, chloromethylphosphonic dichloride, diphenylphosphinic chloride, diphenylphosphinic bromide, dimethylphosphinic chloride, diethylphosphinic bromide, phenyl phenylphosphonochloridate, p-nitrophenyl phenylphosphonochloridate, cresyl phenylphosphonochloridate.

A preferred class of the compounds of Formula II are those compounds of the formula R''OH. Representative of this preferred class of compounds are phenol, o, m, p-cresol, o- ethylphenol, o, m, p - isopropylphenol, p-tert - butylphenol, p - tert - amylphenol, nonylphenol, xylenol, o, m, p - chlorophenol, p - bromophenol, p - iodophenol, dichlorophenol, trichlorophenol, pentachlorophenol, p - cumylphenol, o- cyclohexylphenol, naphthol, methoxyphenol, ethoxyphenol, phenoxyphenol, p - nitrophenol, trifluoromethylphenol, allylphenol, benzylphenol, vanillin, 4 - chloro - 3,5 - dimethylphenol, 4-chloro - 1 - naphthol, 2 - chloro - 4 - nitrophenol, cyanophenol, di - tert - butylphenol, dimethoxyphenol, methylsalicylate, fluorophenol. Especially preferred of this group are phenol, cresol, cumylphenol, nonylphenol, chlorophenol, xylenol, tert-butylphenol, phenylphenol, isopropylphenol and mixtures thereof.

A specialized class of alcohols which are utilized in accordance with this invention are alcohols of the formula (III)       HO—R'''—OH wherein R''' represents isopropylidenediphenylene, e.g.,

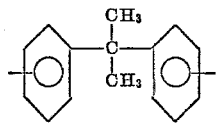

or phenylene, e.g.

Representative of this special class of alcohols are isopropylidenediphenol, hydroquinone, catechol and resorcinol.

In accordance with the novel process of this invention, the reaction between the phosphorus halides and alcohols to prepare organophosphorus esters proceeds in three stages. Use of the carbamate catalysts of this invention, in conjunction with specific temperatures, produces the desired results of this invention. Thus, in the presence of the carbamate catalysts of this invention, the first chlorine of, for example, phosphoryl chloride is replaced at a temperature of from about 85 to about 135° C., preferably 105° C. The second chlorine, i.e., disubstitution, is replaced at a temperature of from about 130 to about 165° C., preferably 150° C. The third chlorine, i.e., trisubstitution, is replaced at a temperature of from about 160 to about 250° C., preferably 200° C. Of course, the specific temperatures for mono-, di and tri-substitution will vary with the particular phosphorus halide being used, but the comparative differences in the temperatures for the stages of substitution will remain approximately the same.

Accordingly, the combination of specific temperatures for mono-, di- and tri-substitution of the desired phosphorus halides, together with the catalysts of this invention, enable those skilled in the art to prepare mono-, di- or tri-organophosphorus esters in selected proportions. Triorganophosphorus esters may be prepared in three stages, with a different alcohol being added to the phosphorus halide reactant at each stage. Similarly, mixtures of esters may be prepared in one reactor. For example, by adding a naphthyl group at the first stage, a chlorophenyl group at the second stage and a phenyl group at the third stage, one may use the same phosphorus halide but merely introduce different appropriate alcohols at the temperature stages set forth above to obtain naphthyl chlorophenyl phenyl phosphate as well as naphthyl phosphorodichloridate and naphthyl chlorophenyl phosphorochloridate. The different compounds may then be recovered separately by methods known in the art. Further, selected proportions of various compounds may be prepared in the same reactor. Thus, if one desires a mixture of naphthyl phosphorodichloridate, naphthyl chlorophenyl phosphorochloridate and naphthyl phenyl phosphorochloridate in proportions of 2:3:1, such selective proportions of the desired products can be made in accordance with the present invention by adding the intended proportion of each appropriate alcohol in the separate stages.

The following examples will serve to illustrate specific embodiments of the concept of this invention but are not to be regarded as restrictive of the scope thereof since it has been found that the catalysts of this invention promote the reaction between virtually any phosphorus halide and any alcohol as defined herein.

EXAMPLE 1

To a mixture of 225 g. phosphoryl chloride and 1.5 g. ethyl N-ethylcarbamate there is added 94 g. phenol over a two hour period at a temperature of 105–110° C. The temperature is held at 110° C. for two hours, cooled and stripped of residual hydrogen chloride and other low boilers. There is afforded 188 g. phenyl phosphorodichloridate and 7 g. diphenyl phosphorochloridate.

EXAMPLE 2

To a mixture of 153.4 g. phosphoryl chloride and 1.0 g. of isopropyl carbamate there is added 94.1 g. phenol over a one hour period at a temperature of 105° C. The temperature is then raised to 115° C. and held for two hours, stripped and allowed to cool to room temperature. Distillation affords phenyl phosphorodichloridate, diphenyl phosphorochloridate and triphenyl phosphate.

EXAMPLE 3

To a mixture of 153.4 g. phosphoryl chloride and 1.6 g. of ethyl N-phenylcarbamate there is added 94.1 g. phenol over a period of one hour at a temperature of 105° C. The temperature is then raised to 115° C. and held for two hours, stripped and cooled. Distillation affords phenyl phosphorodichloridate, diphenyl phosphorodicloridate and triphenyl phosphate.

EXAMPLE 4

To a reaction vessel there is added 225 g. phosphoryl chloride and 0.75 g. ethyl N,N-diethylcarbamate. Over a period of four and one-half hours, a total of 94 g. phenol is added and the pot temperature is raised from 105° C. to 106° C. during the first one and one-half hours, held at 105–110° C. for one and one-half hours and then allowed to gradually cool to room temperature. The reaction mixture is stripped and there is obtained phenyl phosphorodichloridate and diphenyl phosphorochloridate.

EXAMPLE 5

To a mixture of 153.4 g. phosphoryl chloride and 1.5 g. ethyl N,N-dimethyldithiocarbamate there is added 94.1 g. phenol over a one-hour period at 105° C. The temperature is then raised to 115° C. and held for two hours. The reaction mixture is stripped, affording phenyl phosphorodichloridate, diphenyl phosphorochloridate and triphenyl phosphate.

EXAMPLE 6

To a reaction vessel there is added 161 g. phosphoryl chloride and 1.0 g. ethylene dicarbamate. Over a period of approximately five hours, 188 g. phenol is added and the pot temperature is gradually raised from an initial 100° C. to 105° C. after two hours to 145° C. after five hours. Vacuum is applied and there is obtained diphenyl phosphorochloridate and phenyl phosphorodichloridate.

EXAMPLE 7

To a mixture of 225 g. phosphoryl chloride and 2.0 g. ethyl N,N-dibutylcarbamate there is added 94 g. phenol over a one and one-half hour period at a temperature of 103° C. The temperature is held at 105–110° C. for one and one-half hours. Distillation affords phenyl phosphorochloridate.

EXAMPLE 8

To a mixture of 306 g. phosphoryl chloride and 1.5 g. methyl N-phenylcarbamate there is added 94 g. phenol over a five hour period at a temperature of 103–104° C. The temperature is held at 103–104° C. for an additional five hours and allowed to cool to room temperature at 15 mm. Hg. The reaction mixture is stripped and distilled, affording phenyl phosphorodichloridate and diphenyl phosphorochloridate.

EXAMPLE 9

In a reaction pot there is mixed 225 g. phosphoryl chloride and 1.0 g. ethyl carbamate. Addition of 94 g. phenol is started at a temperature of 95° C. and the total addition is carried out over a period of three hours, during which time the temperature is raised to 110° C. The reaction is then held at 105–110° C. for an additional one and one-half hours, stripped and cooled. Distillation affords phenyl phosphorodichloridate and diphenyl phosphorochloridate.

EXAMPLE 10

To a mixture of 153.4 g. phosphoryl chloride and 94.1 g. phenol there is added 1.9 g. 1,4-pentanecarbamate over a period of one hour at 105° C. The temperature is then raised to 115° C. and held for two hours and the reaction mixture is stripped. Distillation affords phenyl phosphorodichloridate and diphenyl phosphorochloridate.

The following table illustrates further examples of the reaction of a phosphorus halide and an alcohol or thioalcohol in the presence of a carbamate catalyst:

| Example | Phosphorus halide | Alcohol | Catalyst |
| --- | --- | --- | --- |
| 11 | Phosphoryl bromide | o, m, p-Cresol | Methyl thiocarbamate. |
| 12 | Thiophosphoryl chloride | o-Ethylphenyl | Ethylene N,N,N',N'-tetraethyldicarbamate. |
| 13 | Phenyl phosphorodichloridate | Xylenol | Octyl carbamate. |
| 14 | o-Methoxyphenyl phosphorodichloridate | Nonylphenol | Butyl dithiocarbamate. |
| 15 | S-phenyl phosphorochloridothioate | o, m,p-Cresol | Propyl thiocarbamate. |
| 16 | Dicresyl phosphorochloridate | Trichlorophenol | Methyl carbamate. |
| 17 | O,O-diphenyl phosphorochloridothioate | p-Iodophenol | Methyl N,N-diethylcarbamate. |
| 18 | S,S-diphenyl phosphorochloridotrithioate | o-Cyclohexyl phenol | Phenyl dithiocarbamate. |
| 19 | Phenylphosphonic dichloride | Thiophenol | Phthalyl carbamate. |
| 20 | Chloromethylphosphonic dibromide | o-Methoxy phenol | Cyclohexyl N,N-dimethylcarbamate. |
| 21 | Phenylphosphonothioic dichloride | Phenoxyphenol | Benzyl carbamate. |
| 22 | Diphenylphosphinic chloride | Cyanophenol | Ethyl N-cyclohexylthiocarbamate. |
| 23 | Diethylphosphinothioic bromide | Methyl salicylate | Ethyl N,N-diphenylcarbamate. |
| 24 | Phenyl phenylphosphonic chloride | 4,4'-isopropylidene bisphenol | Naphthyl N-phenyl, N-benzylcarbamate. |
| 25 | S-phenyl phenylphosphonothioic bromide | Resorcinol | 2,4-dichlorophenyl carbamate. |
| 26 | O-phenyl phenylphosphonothioic chloride | Hydroquinone | Isopropyl N,N-diisopropylcarbamate. |
| 27 | S-phenyl phenylphosphonodithioic chloride | Catechol | Cyclohexyl N-benzylthiocarbamate. |
| 28 | p-Chlorophenyl phosphorodibromidate | p-Cumylphenol | Hexyl N,N-dicyclohexylcarbamate. |
| 29 | Cresyl phosphorodichloridate | p-tert-Amylphenol | Allyl N,N-diethylcarbamate. |
| 30 | Nonylphenyl phosphorodichloridate | Pentachlorophenol | Methyl N,N-diallylcarbamate. |
| 31 | Cumylphenyl phosphorodibromidate | Phenoxyphenol | Ethoxyethyl N,N-dimethyldithiocarbamate. |
| 32 | Naphthyl phosphorodichloridate | p-Bromophenol | Methyl N,N-bis(cyanoethyl)carbamate. |
| 33 | Diphenyl phosphorochloridate | Naphthol | Propyl N-chloroethylcarbamate. |
| 34 | di-2-ethylhexyl phosphorochloridate | Fluorophenol | Isopropyl thiocarbamate. |
| 35 | Phenylphosphonic dichloride | Nitrophenol | Cyclopentyl carbamate. |
| 36 | Cumyl phosphorodichloridate | Nonylphenol | Ethyl N-decynylcarbamate. |
| 37 | Phenyl phosphorodichloridate | Phenol | Methyl N-butynyldithiocarbamate. |

EXAMPLE 38

To a mixture of 0.1 mole of ethyl N-ethylcarbamate and one mole of cresol there is added one mole of phosphoryl chloride over a period of one hour at a temperature of 125–140° C. and the reaction mixture is stripped and allowed to cool. Distillation affords cresyl phosphorodichloridate.

EXAMPLE 39

(1) To a mixture of 225 g. phosphoryl chloride and 0.75 g. ethyl N-ethylcarbamate there is added 109 g. cresol over a period of two hours at a temperature of 105° C. The temperature is held at 105–110° C. for two hours to afford cresyl phosphorodichloridate.

(2) The temperature of the reaction mixture obtained in (1) is raised to 135° C. and 109 g. cresol is fed into the reactor over a two-hour period. The temperature is held at 150° C. for an additional one and one-half hours to afford dicresyl phosphorochloridate.

(3) The temperature of the reaction mixture obtained in (2) is raised to 200° C. and 109 g. cresol is fed into the reactor during two hours. The temperature is maintained at 200–210° C. for two hours to afford tricresyl phosphate.

EXAMPLE 40

(1) To a mixture of 225 g. phosphoryl chloride and 1.5 g. ethyl N-ethylcarbamate there is added 94 g. phenol over a two-hour period at a temperature of 105–110° C. The temperature is held for two hours at 110–115° C. to afford phenyl phosphorodichloridate.

(2) The temperature of the reaction mixture of (1) is raised to 135° C. and 109 g. cresol is fed into the reactor during two hours. The temperature is held at 150° C. for an additional two hours to afford cresyl phenyl phosphorochloridate.

(3) The temperature of the reaction mixture of (2) is raised to 200° C. and 122 g. xylenol is added during two hours. The temperature is maintained at 220° C. for one and one-half hours and the reaction mixture is vacuum treated and allowed to cool to room temperature. Distillation affords cresyl phenyl xylyl phosphate.

EXAMPLE 41

To a mixture of 153.4 g. phosphoryl chloride and 1.5 g. ethyl N-ethylcarbamate there is added 94 g. phenol during two hours at a temperature of 105° C. The temperature is then raised to 150° C. while gradually adding an additional 94 g. phenol and the temperature is finally raised to 180° C. while gradually adding a final portion of 94 g. phenol. The temperature is held at 200° C. for two hours, stripped and allowed to cool. Distillation affords triphenyl phosphate.

EXAMPLE 42

A mixture of 282 g. phenol, 153.4 g. phosphoryl chloride and 1.0 g. ethyl N-ethylcarbamate is heated to 200° C. over four to six hours. The temperature is then maintained at 200° C. under vacuum for two hours. Distillation affords triphenyl phosphate.

EXAMPLE 43

(1) To a mixture of 920 g. phosphoryl chloride and 23 g. ethyl carbamate there is added a mixture of 614 g. cumylphenol and 794 g. nonylphenol during two hours at a temperature of 105–110° C. to afford a mixture of cymylphenylphosphorodichloridate and nonylphenylphosphorodichloridate.

(2) The temperature of the reaction mixture obtained in (1) is raised to 135° C. and 94 g. phenol is added over a two hour period. The temperature is held at 150° C. for an additional one and one-half hours to afford a mixture of cumylphenyl phenyl phosphorochloridate and nonylphenyl phenyl phosphorochloridate.

(3) The temperature of the reaction mixture obtained in (2) is raised to 200° C. and 94 g. phenol is added over two hours. The temperature is maintained at 200°–210° C. for two hours to afford a mixture of cumylphenyl diphenyl phosphate and nonylphenyl diphenyl phosphate.

Alternatively, steps (2) and (3) may be combined by adding sufficient phenol to allow the reaction to go directly to the phosphate from the dichloridate.

EXAMPLE 44

(1) To a mixture of 225 g. phosphoryl chloride and 1.3 g. ethyl carbamate there is added 109 g. cresol over a period of two hours at a temperature of 105° C. The temperature is held at 105°–110° C. for two hours to afford cresyl phosphorodichloridate.

(2) The temperature of the reaction mixture obtained in (1) is raised to 135° C. and 94 g. phenol is added during two hours at a temperature of 150° C. and held for an additional two hours to afford cresyl phenyl phosphorochloridate.

(3) The temperature of the reaction mixture obatined in (2) is raised to 200° C. and an additional 94 g. phenol is added during two hours. The temperature is held at 200–210° C. for an additional two hours to afford cresyl diphenyl phosphate.

The embodiments of the invention in which an exclusive property or privilege is claimed are defined as follows:

1. The process of preparing organophosphorus esters which comprises reacting a phosphorus halide of the formula

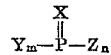

wherein

X represents oxygen or sulfur;
Y represents R or R'X;
R represents alkyl, alkenyl, alkynyl, cycloalkyl, cycloalkenyl, cycloalkynyl, heterocyclyl or aryl;
R' represents alkyl or aryl;
$m$ represents 0 when $n=3$, 1 when $n=2$ and 2 when $n=1$;
$n$ represents 1, 2 or 3; and
Z represents chloro or bromo with a compound of the formula

R"XH wherein

R" represents aryl; and
X represents oxygen or sulfur at a temperature of up to about 250° C. in the presence of a catalytic amount of a carbamate containing a nitrogen atom which forms a complex with the phosphorus moiety of said phosphorus halide.

2. The process of claim 1 wherein R" is selected from the group consisting of phenyl, cresyl, cumylphenyl, nonylphenyl, xylyl, tert-butylphenyl, phenylyl, isopropylphenyl, chlorophenyl and mixtures thereof.

3. A process for preparing an organophosphorusdihalidate which comprises reacting a phosphorus halide according to claim 2 with an approximately equimolar amount of a compound of the formula R"XH according to claim 1 at a temperature of about 135° C. in the presence of a catalytic amount of a carbamate containing a nitrogen atom which forms a complex with the phosphorus moiety of said phosphorus halide.

4. The process of claim 3 wherein R" is selected from the group consisting of phenyl( cresyl, cumylphenyl, nonylphenyl, xylyl, tert-butylphenyl, phenylyl, isopropylphenyl, chlorophenyl and mixtures thereof.

5. The process of claim 3 wherein said organophosphorusdihalidate is selected from phenyl phosphorodichloridate, cresyl phosphorodichloridate, tert-butylphenyl phosphorodichloridate, cumylphenyl phosphorodichloridate, nonylphenyl phosphorodichloridate, phenylyl phosphorodichloridate, xylyl phosphorodichloridate, isopropylphenyl phosphorodichloridate, chlorophenyl phosphorodichloridate and mixtures thereof.

6. A process for preparing a diorganophosphorushalidate which comprises reacting an organophosphorusdihalidate with an approximately equimolar amount of a compound of the formula R"XH according to claim 1 at a temperature of about 165° C. in the presence of a catalytic amount of a carbamate containing a nitrogen atom which forms a complex with the phosphorus moiety of said organophosphorusdihalidate.

7. The process of claim 6 wherein said diorganophosphorushalidate is selected from nonylphenyl phenyl phosphorochloridate and cumylphenyl phenyl phosphorochloridate and mixtures thereof.

8. A process for preparing organophosphorus esters which comprises reacting, in the presence of a catalytic amount of a carbamate containing a nitrogen atom which forms a complex with a phosphorus moiety, (1) a phosphorus halide of claim 1 with an approximately equimolar amount of a first compound of a formula of R"XH of claim 2 at a temperature of about 85–135° C. to form an organophosphorusdihalidate, (2) adding an approximately equimolar amount of a second compound of formula R"XH to the reaction product of (1) at a temperature of about 130–165° C. to form a diorganophosphorushalidate and (3) adding an approximately equimolar amount of a third compound of formula R"XH to the reaction product of (2) at a temperature of about 160–250° C.

9. The process of claim 8 wherein said compound of formula R"XH is selected from the group consisting of phenol, cresol, cumylphenol, nonylphenol, xylenol, tert-butylphenol, phenyl phenol, isopropyl phenol, chlorophenol and mixtures thereof.

10. The process of preparing organophosphorus esters which comprises reacting a phosphorus halide of the formula $$Y_m-\overset{O}{\underset{\|}{P}}-Z_n$$

wherein
Y represents R or R'O;
R represents alkyl, alkenyl, alkynyl, cycloalkyl, cycloalkenyl, cycloalkynyl, heterocycyl or aryl;
R' represents aryl;
$m$ represents 0 when $n=3$, 1 when $n=2$ and 2 when $n=1$;
$n$ represents 1, 2 or 3; and
Z represents chloro or bromo
with an approximately $n$ molar amount of a compound of the formula

R"XH wherein
R" represents aryl; and
X represents oxygen or sulfur
at a temperature of up to about 250° C. in the presence of a catalytic amount of a carbamate which forms a complex with a phosphorus moiety.

11. The process of preparing organophosphorus esters which comprises reacting a phosphorus halide of the formula $$Y_m-\overset{O}{\underset{\|}{P}}-Z_n$$

wherein
Y represents R or R'O;
R represents alkyl, alkenyl, alkynyl, cycloalkyl, cycloalkenyl, cycloalkynyl, heterocyclyl or aryl;
R' represents aryl;
$m$ represents 0 when $n=3$, 1 when $n=2$ and 2 when $n=1$;
$n$ represents 1, 2 or 3; and
Z represents chloro or bromo
with an approximately $n$ molar amount of a compound of the formula

R"OH wherein R" represent aryl
at a temuerature of up to 250° C. in the presence of a catalytic amount of a carbamate which forms a complex with a phosphorus moiety.

12. The process of claim 9 wherein R" is selected from the group consisting of phenyl, cresyl, cumylphenyl, nonylphenyl, xylyl, tert-butylphenyl, phenylyl, isopropylphenyl, chlorophenyl and mixtures thereof.

13. The process of claim 11 wherein said carbamate is selected from ethyl carbamate, ethyl N-ethylcarbamate, isopropyl carbamate, ethyl N-phenylcarbamate, ethyl N,N-diethylcarbamate and ethylene dicarbamate.

14. The process of preparing organophosphorus esters which comprises reacting a phosphorus halide of the formula $$Y_m-\overset{O}{\underset{\|}{P}}-Z_n$$

wherein
Y represent R or R'O;
R represents alkyl, alkenyl, alkynyl, cycloalkyl, cycloalkenyl, cycloalkynyl, heterocyclyl or aryl;
R' represents aryl;
$m$ represents 0 when $n=3$, 1 when $n=2$ and 2 when $n=1$;
$n$ represents 1, 2 or 3; and
Z represents chloro or bromo
with an approximately $n$ molar amount of a compound of the formula

HO—R'''—OH wherein R''' represents isopropylidenediphenylene or phenylene
at a temperature of up to about 250° C. in the presence of a catalytic amount of a carbamate which forms a complex with a phosphorus moiety.

15. The process of preparing an organophosphorus ester according to claim 11 which comprises reacting phosphoryl chloride with an approximately trimolar amount of phenol at a temperature of up to about 250° C. in the presence of a carbamate catalyst which forms a complex with a phosphorus moiety.

16. The process of claim 11 wherein said organophosphorus ester is selected from triphenyl phosphate, tricresyl phosphate, cumylphenyl diphenyl phosphate, cresyl diphenyl phosphate, nonyl phenyl diphenyl phosphate and mixtures thereof.

References Cited
UNITED STATES PATENTS
2,870,192  1/1959  Bonstedt _____ 260—975

LEWIS GOTTS, Primary Examiner

A. H. SUTTO, Assistant Examiner

U.S. Cl. X.R.

260—295 CA, 309.6, 326.83, 332.2 R, 340.3, 345.7, 347, 455 A, 482 B, 482 C, 543 P, 960, 975, 30.6

PO-1050
(5/69)

UNITED STATES PATENT OFFICE
CERTIFICATE OF CORRECTION

Patent No. 3,751,529        Dated August 7, 1973

Inventor(s) Joseph W. Baker and Ignatius Schumacher

It is certified that error appears in the above-identified patent and that said Letters Patent are hereby corrected as shown below:

Column 1, line 4, "Ingatius" should be corrected to read --Ignatius--.

Column 5, line 34, "Cyclohexy" should be corrected to read --Cyclohexyl--.

Column 11, line 17, "dicloridate" should be corrected to read --chloridate--;

Table (columns 11 and 12) Example 12, second column, "o-Ethylphenyl" should be corrected to read --o-Ethylphenol--; same table, Example 27, second column, "Catedhol" should be corrected to read --Catechol--.

Column 12, line 2, "chloridate" should be corrected to read --dichloridate--; same column, line 26, please insert --ethyl-- before "1,4-pentanecarbamate".

Column 13, line 47, "cymylphenylphosphorodichloridate" should be corrected to read --cumylphenylphosphorodichloridate--.

Column 14, line 41, "claim 2" should be corrected to read --claim 1--; same column, line 47, please delete "(" which follows the word phenyl and insert therefor -- , --.

Column 15, line 24, "heterocycyl" should be corrected to read --heterocyclyl--.

Signed and sealed this 2nd day of April 1974.

(SEAL)
Attest:

EDWARD M.FLETCHER,JR.
Atesting Officer

C. MARSHALL DANN
Commissioner of Patents